(12) United States Patent
Santori et al.

(10) Patent No.: US 8,244,134 B2
(45) Date of Patent: Aug. 14, 2012

(54) OPTICAL INTERCONNECT

(76) Inventors: Charles Santori, Palo Alto, CA (US); David Fattal, Palo Alto, CA (US); Wei Wu, Palo Alto, CA (US); Robert Bicknell, Corvallis, OR (US); Shih-Yuan Wang, Palo Alto, CA (US); R. Stanley Williams, Palo Alto, CA (US); Duncan Stewart, Palo Alto, CA (US); Nathaniel Quitoriano, Palo Alto, CA (US); Raymond Beausoleil, Redmond, WA (US)

( * ) Notice: Subject to any disclaimer, the term of this patent is extended or adjusted under 35 U.S.C. 154(b) by 484 days.

(21) Appl. No.: 11/820,310

(22) Filed: Jun. 19, 2007

(65) Prior Publication Data

US 2008/0317406 A1   Dec. 25, 2008

(51) Int. Cl.
*H04J 14/02*   (2006.01)
*H04B 10/00*   (2006.01)

(52) U.S. Cl. ........... 398/88; 398/118; 398/130; 398/140

(58) Field of Classification Search .................. 398/118, 398/164, 88, 130, 131, 140, 156, 91, 84, 398/87, 101, 127, 128, 135, 138
See application file for complete search history.

(56) References Cited

U.S. PATENT DOCUMENTS

| | | | |
|---|---|---|---|
| 5,093,879 A | 3/1992 | Bregman et al. | |
| 5,202,567 A | 4/1993 | Hamanaka | |
| 5,325,224 A | 6/1994 | Lang et al. | |
| 5,362,961 A | 11/1994 | Hamanaka | |
| 5,500,523 A | 3/1996 | Hamanaka | |
| 5,661,584 A * | 8/1997 | Redmond et al. | 398/45 |
| 5,857,042 A * | 1/1999 | Robertson et al. | 385/33 |
| 5,920,664 A | 7/1999 | Hirabayashi et al. | |
| 5,986,788 A * | 11/1999 | Sasaki et al. | 398/118 |
| 6,195,475 B1 | 2/2001 | Beausoleil, Jr. et al. | |
| 6,314,201 B1 | 11/2001 | Roder | |
| 6,515,257 B1 | 2/2003 | Jain et al. | |
| 6,591,042 B2 * | 7/2003 | Tatah | 385/43 |
| 6,597,496 B1 | 7/2003 | Nayfeh et al. | |
| 6,724,512 B2 | 4/2004 | Carlson et al. | |
| 7,015,454 B2 | 3/2006 | Stone | |
| 7,024,070 B2 * | 4/2006 | Spivey et al. | 385/17 |
| 7,389,051 B2 * | 6/2008 | Morioka et al. | 398/127 |
| 2002/0015520 A1 | 2/2002 | Roder | |
| 2002/0141029 A1 | 10/2002 | Carlson et al. | |
| 2003/0035576 A1 | 2/2003 | Roder | |
| 2003/0147652 A1 * | 8/2003 | Green et al. | 398/118 |
| 2004/0159777 A1 | 8/2004 | Stone | |

(Continued)

FOREIGN PATENT DOCUMENTS

CN   2171432 Y   7/1994

(Continued)

OTHER PUBLICATIONS

Frank Sauer et al. "Refractive-diffractive micro-optics for permutation interconnects", Optical Engineering, May 1994, vol. 33, No. 5.*

*Primary Examiner* — M. R. Sedighian

(57) ABSTRACT

An optical interconnect has a plurality of optical sources, a first lens configured to collimate optical beams from the plurality of optical sources, a second lens configured to refocus the optical beams, and a plurality of optical receivers configured to receive the refocused optical beams from the second lens.

17 Claims, 10 Drawing Sheets

U.S. PATENT DOCUMENTS

| | | |
|---|---|---|
| 2005/0224946 A1 | 10/2005 | Dutta |
| 2006/0034572 A1 | 2/2006 | Morris et al. |

FOREIGN PATENT DOCUMENTS

| | | |
|---|---|---|
| EP | 0658786 A2 | 9/1991 |
| EP | 0477036 B1 | 12/1995 |
| EP | 0811862 B1 | 8/2004 |
| JP | 5-40214 | 2/1993 |
| JP | 5-308327 | 11/1993 |
| JP | H5-308327 | 11/1993 |
| JP | 060-011666 | 1/1994 |
| JP | 6-303198 | 10/1994 |
| JP | 8-237204 | 9/1996 |
| JP | H8-237204 | 9/1996 |
| JP | 2000-022643 | 1/2000 |
| JP | 2002-353494 | 12/2002 |
| JP | 2006-523428 | 10/2006 |
| WO | WO 01/26255 A1 | 4/2001 |
| WO | WO 03/052495 A1 | 6/2003 |
| WO | WO-2004090976 | 10/2004 |

* cited by examiner

US 8,244,134 B2

OPTICAL INTERCONNECT

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

Systems making use of optical components often rely upon the precise manipulation of optical energy, such as a beam of light, to accomplish a desired task. This is especially true in systems utilizing light for high-speed, low-energy communication between circuit boards. The manipulation of an optical signal may include selectively encoding information on a light beam of the optical signal and directing the light beam of the optical signal to a sensor that detects the encoded light beam.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
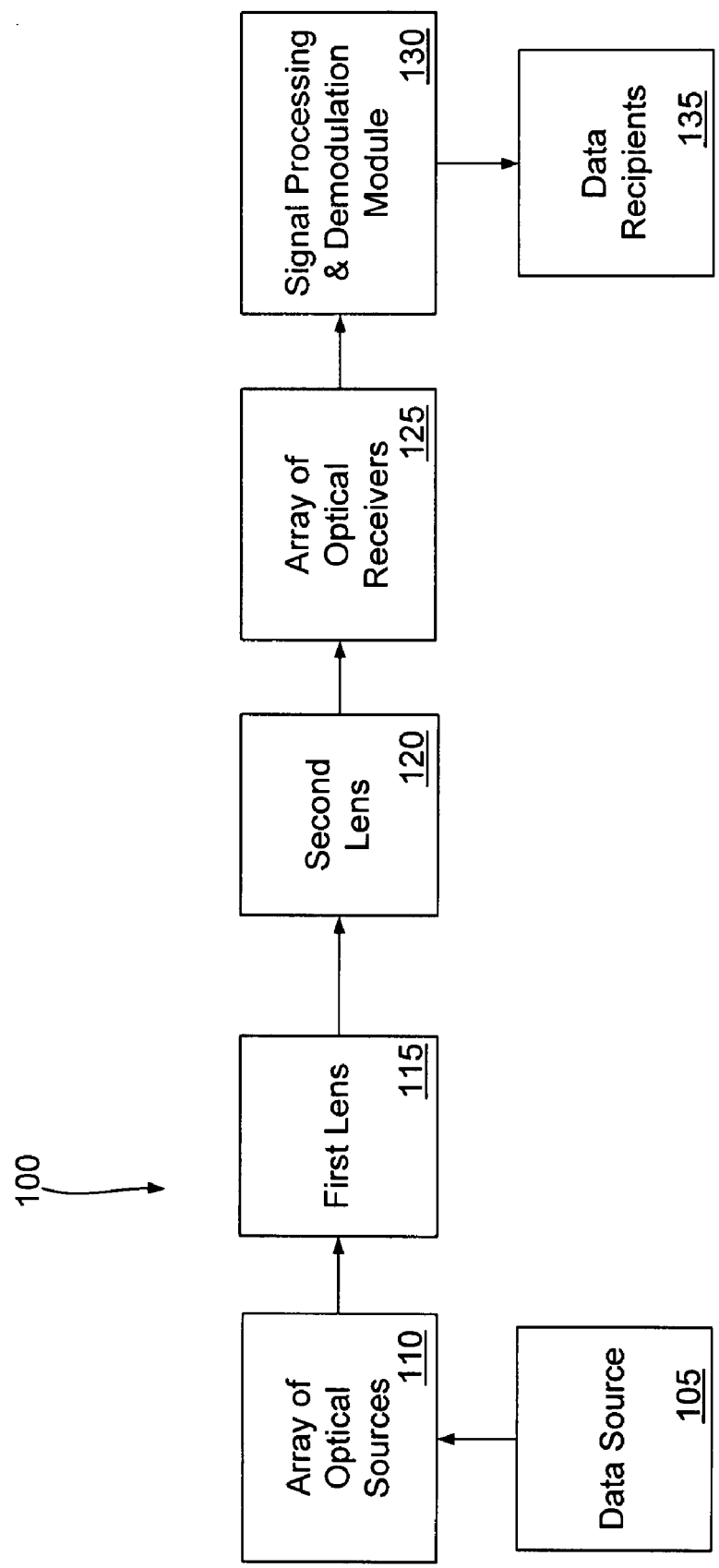
FIG. 1 is a block diagram of an exemplary optical interconnect, according to principles described herein.

As noted above, light or optical beams can be used for a variety of purposes, including the transmission of data. In some such systems, the optical beam is directed or redirected into an optical path where it can be detected or received by a designated component. However, when optical beams are used to communicate data between physically separate electronic components, such as in separate circuit boards, correct alignment between the components may be critical. Additionally, it may be desirable to communicate optically over multiple channels to increase bandwidth and/or reliability, without occupying a large space on a board. Furthermore, it may also be desirable to minimize optical impedance, interference, and/or distortion in such systems.

One optical solution to providing data transmission between circuit board components includes using waveguides to route an optical signal bearing data. For example, plastic waveguides can be used to route an optical signal bearing data to the edge of a board. The optical signal is then directed into optical waveguides in a backplane of a circuit board rack, and then into another waveguide on another board. In addition to waveguide fabrication costs and problems associated with optical losses at waveguide junctions, this solution in general has a longer physical data path than free space optical data transmission between components.

However, while free space optical data transmission solutions offer significant advantages over waveguide and electrical conductor solutions, they are often accompanied by the aforementioned alignment problems. Moreover, optical components may occupy a significant amount of circuit board area when multiple optical channels are designed. Hence, it may be desirable to provide a free space optical interconnect system for inter-component data transmission between circuit boards that is resistant to misalignment problems and enables multi-channel communication while occupying minimal amounts of board space.

To accomplish these and other goals, the present specification discloses systems and methods relating to an optical interconnect having a plurality of optical sources, a first lens configured to collimate optical beams from the plurality of optical sources, a second lens configured to refocus the optical beams, and a plurality of optical receivers configured to receive the refocused optical beams from the second lens.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical interconnect" refers broadly to a component that links portions of an optical pathway along which a light beam is propagating. The optical interconnect may guide or redirect the light beam so that the beam is incident on or reaches an optical component configured to receive the light beam. Consequently, with appropriate optical interconnects, an optical pathway can be configured with any length or shape as suits a particular application.

As used in the present specification and in the appended claims, the term "collimate" refers to a process by which a plurality of divergent optical rays are redirected into a substantially parallel orientation with respect to each other. A divergent beam from a single source can be collimated with respect to itself. Alternatively or additionally, light beams from separate sources can also be collimated with respect to each other.

As used in the present specification and in the appended claims, the term "refocus" refers to a process by which a plurality of optical beams propagating in a substantially parallel direction are manipulated to substantially converge to a point.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical interconnects and exemplary systems and methods of utilizing the exemplary optical interconnects.

Exemplary Optical Interconnects

Referring now to FIG. 1, a block diagram of an exemplary optical interconnect (100) is shown. The exemplary optical interconnect (100) includes a data source (105), an array of optical sources (110), a first lens (115), a second lens (120), an array of optical receivers (125) and a signal processing module (130) which provides the data to desired data recipients (135), e.g. electronic components that will make use of the data from the data source (105). The flow of data from a data source (105) through the components of the interconnect (100) to the data recipients (135) is illustrated by following the arrows in FIG. 1.

In some embodiments, the data source (105) may be one or more integrated circuits on a first circuit board that provide digital or analog data for transmission to a data recipient. The data source (105) is in communication with the array of optical sources (110) and provides data to the optical sources (110) for optical transmission. In some embodiments, the data source (105) may include multiple separate components that all provide data for transmission by the array of optical sources (110). Furthermore, a plurality of optical sources may be associated with each of these data providing components in the data source (105), for example, to increase transmission reliability through redundant optical sources and/or to increase the data transmission rate through parallel channels.

The array of optical sources (110) may include modulator elements configured to selectively switch on and off or otherwise manipulate optical beams produced by the array of optical sources (110), thereby encoding data from the data source (105) into the optical beams for data transmission. As will be well understood by those skilled in the art, a variety of possible optical modulation schemes exist and may be used to encode data from the data source (105) into optical beams produced by the array of optical sources (110).

The optical sources in the array of optical sources (110) may, in some embodiments, include vertical cavity surface emitting lasers ("VCSELs"). In other embodiments, the optical sources may include other types of semiconductor lasers, light-emitting diodes, lamps, incandescent lights, and/or the like.

The array of optical sources (110) is configured to direct encoded optical beams from each of its constituent optical sources to divergent points on the first lens (115). The first lens (115) is configured to collimate the optical beams from the array of optical sources (110) and direct the collimated optical beams towards the second lens (120). In between the two lenses, the collimated beams from the individual sources will likely be superimposed on each other, but propagate at slightly different angles. The first and second lenses (115, 120) may include curved surfaces that are convex, concave or aspheric, and may be optimized for collimation of optical beams from highly divergent source angles. The most highly curved surfaces of the first and second lenses (115, 120) may face each other.

The second lens (120) is configured to refocus the optical beams received from the first lens (115), forming an image of the source array onto an array of optical receivers (125).

The optical receivers in the array (125) are configured to receive the refocused modulated optical beams. The optical receivers may also be configured to output an electric signal representative of one or more aspects of the optical beams. For example, the optical receivers may produce data signals bearing the data that has been encoded or modulated in the received light beam. In this way, data transmitted from components of the data source (105) may be received and utilized by data recipients (135).

In some embodiments, the optical receivers in the array (125) include one or more photodiodes. In other embodiments, the optical receivers may include, but are not limited to, one or more waveguides, fiber optic material, optical cable, optical sensors, lenses, semiconductors, and combinations thereof.

Before being passed to the data recipients (135), signals received by the array of optical receivers (125) may be analyzed by a signal processing module (130) that matches modulated optical beams to intended data recipients (135). The intended data recipients (135) of optical beams transmitted from the array of optical sources (110) through the lenses (115, 120) to the array of optical receivers (125) may be discerned by any of many different methods known in the art, as will be explained in more detail in relation to other figures of the present specification.

Figure 2:
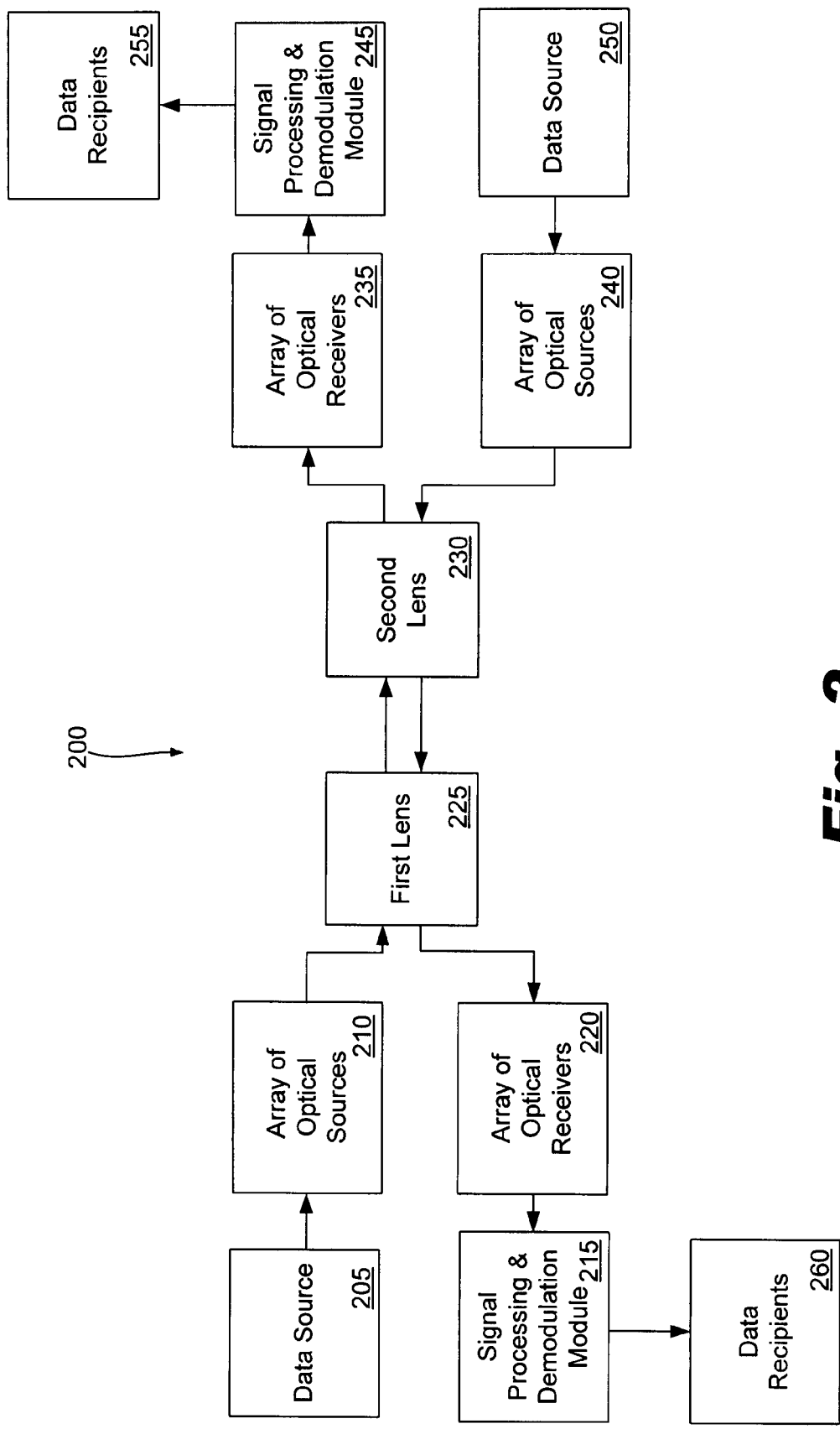
FIG. 2 is a block diagram of an exemplary optical interconnect, according to principles described herein.

Referring now to FIG. 2, a block diagram illustrating another exemplary optical interconnect (200) is shown. While the exemplary optical interconnect (200) employs similar components to those described in FIG. 1, the exemplary optical interconnect (200) of the present embodiment is configured for bilateral transmission and reception of data through the first and second lenses (225, 230). The arrows pointing to the right indicate the flow of data from a first data source (205) through components of the optical interconnect (200) to a first set of data recipients (255), and the arrows pointing to the left indicate the flow of data from a second data source (250) through the components of the optical interconnect (200) to a second set of data recipients (260).

The exemplary optical interconnect (200) also includes first and second arrays of optical sources (210, 240, respectively), first and second arrays of optical receivers (235, 220, respectively), and first and second signal processing modules (245, 215, respectively). The first and second data sources (205, 250, respectively) are configured to provide data to the first and second arrays of optical sources (210, 240, respectively).

The first lens (225) is configured to collimate optical beams from the first array of optical sources (210) representative of data from the first data source (205), and the second lens (230) is configured to collimate optical beams from the second array of optical sources (240) representative of data from the second data source (250). Optical beams collimated by the first lens (225) are directed towards the second lens (230), and optical beams collimated by the second lens (230) are likewise directed towards the first lens (225).

The first lens (225) is further configured to refocus optical beams received from the second lens (230), forming an image of the second array of optical sources (240) onto the second array of optical receivers (220), where the optical beams are thereafter processed by the second signal processing module (215) and the data encoded on the optical beams is routed to the second set of data recipients (260).

The second lens is further configured to refocus optical beams received from the first lens (225), forming an image of the first array of optical sources (210) onto the first array of optical receivers (235), where the optical beams are thereafter processed by the first signal processing module (245) and the data encoded on the optical beams is routed to the first set of data recipients (255).

Referring now to FIGS. 3A-3D, exemplary optical interconnects (300) are shown. The exemplary optical interconnects (300) include a first lens (325) and a second lens (335) consistent with the principles of the present specification. The first lens (325) and the second lens (335) have opposing substantially convex surfaces and are substantially aligned or optically coupled. Each of the lenses (325, 335) is held in position by housing brackets (310, 315, 340, 345).

Disposed at a focal length from each of the first and second lenses (325, 335) are first and second optical interface assemblies (305, 355). In some embodiments, the first optical interface assembly (305) includes an array of optical sources and the second optical interface assembly (355) includes an array of optical receivers. In other embodiments, the first and second optical interface assemblies (305, 355) each include arrays of both optical sources and optical receivers, consistent with the principles discussed in relation to FIG. 2.

A plurality of substantially divergent optical beams (320) propagate between the first optical interface assembly (305) and the first lens (325) and include optical beams emanating from optical sources in the first optical interface assembly (305). The divergent rays emanating from each of the optical sources in the first optical interface assembly (305) may together substantially or entirely fill the aperture of the first lens (325).

A plurality of substantially collimated beams (330) between the first lens (325) and the second lens (335) includes optical beams from optical sources in the first optical interface assembly (305) that are collimated by the first lens (325) and directed toward the second lens (335).

The second lens (335) is configured to refocus optical beams received from the first lens (325) and direct them toward optical receivers in the second optical interface (355). The plurality of divergent optical beams (350) between the second lens (335) and the second optical interface (355) are refocused by the second lens (335) and directed toward the second optical interface (355).

The plurality of divergent optical beams (350) between the second lens (335) and the second optical interface (355) may also include optical beams originating at optical sources in the second optical interface (355) that are directed toward, and collimated by, the second lens (335). Furthermore, the plurality of collimated optical beams (330) propagating between the first and second lenses (325, 335) may include optical beams collimated by the second lens (335) and directed toward the first lens (325).

The first lens (325) may also be configured to refocus the optical beams received from the second lens (335). Thus, the plurality of divergent optical beams (320) propagating between the first optical interface (305) and the first lens (325) may also include optical beams that are refocused by the first lens (325) and directed to corresponding optical receivers in the first optical interface (305).

In the present embodiment, each optical source on one of the first and second optical interfaces (305, 355) includes a corresponding optical receiver on the other of the first and second optical interfaces (305, 355). Thus, to achieve correct functionality from the optical interconnect (300), the first and second lens (325, 335) must be aligned within an acceptable degree of tolerance, such that optical beams from optical sources in the optical interfaces (305, 355) are directed to the appropriate corresponding optical receivers after collimation and refocusing by the first and second lenses (325, 335).

In some embodiments, the first optical interface (305) is displaced from the first lens (325) at a defined focal length equal to the displacement of the second optical interface (355) from the second lens (335). The first and second lenses (325, 335) may be separated in free space at a distance that is substantially double that of the aforementioned defined focal length, so that the angular properties of the rays produced by the optical sources are replicated at the destination image plane. The optical interconnect (300) is configured to tolerate positioning error between the first and second lenses (325, 335). Some factors affecting the degree of positioning error tolerated by the optical interconnect (300) include the dimensions separating individual components in the optical interfaces (305, 355), the size and numerical aperture of the lenses (325, 335), and the diameter of optical beams emanated by the optical sources.

Separating the first and second lenses (325, 335) in free space by a distance that is substantially double that of the defined focal length has several possible advantages. For example, at this distance, the position and angle of each optical beam emanating from the first optical interface (305) will be replicated at the second optical interface (355) with inversion. As such, image shift due to small focal errors and excessively steep ray angles after the second lens (335) may be avoided.

Furthermore, an optical beam formed by collimating the light from a large array of optical sources cannot remain collimated for a long distance, but will remain collimated over a distance less than twice the focal distance. Thus, a distance between the first and second lenses (325, 335) of approximately double the focal length may be desirable when the first optical interface (305) has an array of optical sources that is considerable in size.

In some cases, however, separating the first and second lenses (325, 335) by a distance greater than double the focal length may occur without a causing a detriment to the overall system health. For example, if the array of optical sources on the first optical interface (305) and the array of optical receivers on the second optical interface (355) are relatively small, the optical beams emanating from the first optical interface (305) may remain collimated over longer distances. Furthermore, in some such embodiments, the focal length of the lenses (325, 335) may be very small to counteract angular misalignment concerns, and a separation greater than double the focal length may be needed for proper functioning of the optical interconnect (300).

In one non-limiting embodiment, the first and second optical interfaces (305, 355) are a total of 5 centimeters apart. The first optical interface (305) includes a plurality of optical sources displaced at a focal distance of 1.25 centimeters from the first lens (325), and the second optical interface (355) includes a plurality of optical receivers displaced at a focal distance of 1.25 centimeters from the second lens (335). The first and second lenses (325, 335) are separated by 2.5 centimeters of free space. The optical sources and receivers in the optical interfaces (305, 355) are divergent at a 0.1 millimeter pitch. In this exemplary embodiment, up to a 1 millimeter positioning error and a 0.01 radian angular error in the alignment between the first and second lenses (325, 335) may be tolerated by the optical interconnect (300) without adversely affecting communication between components of the first and second optical interfaces (305, 355).

Figure 3A:
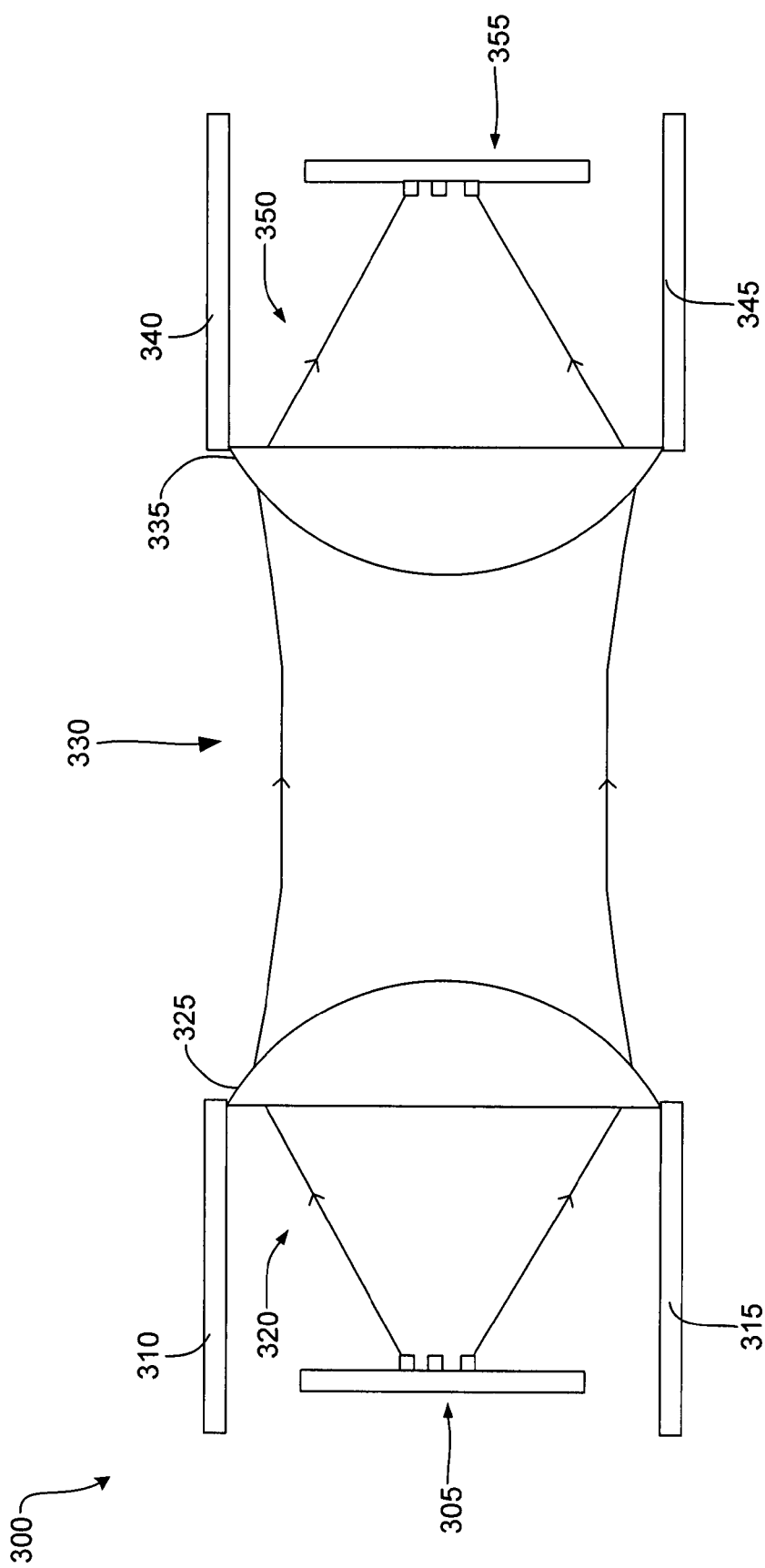
FIG. 3A is an illustration of an exemplary optical interconnect, according to principles described herein.
Figure 3B:
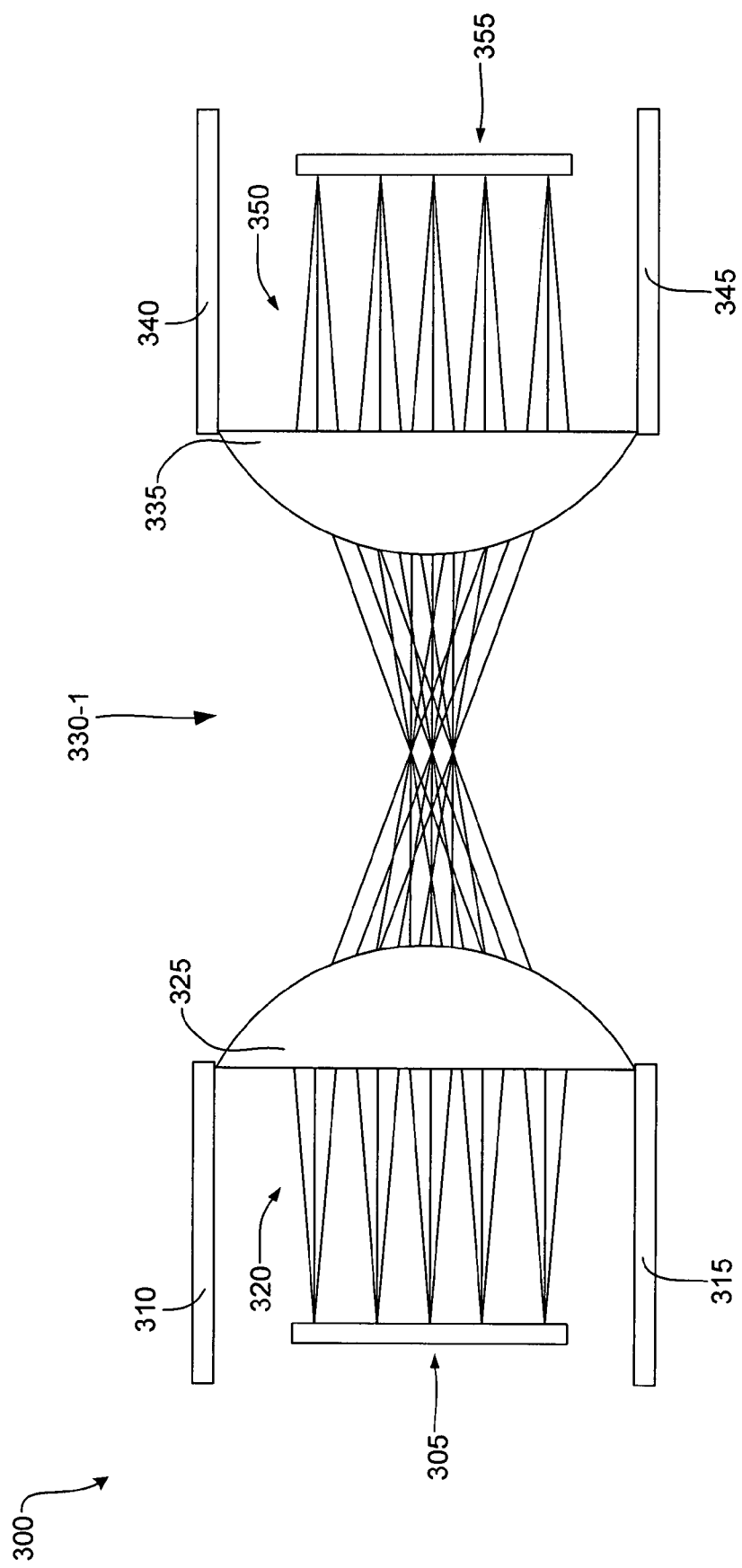
FIG. 3B is an illustration of an exemplary optical interconnect, according to principles described herein.

FIG. 3B illustrated another exemplary embodiment, in which divergent light from each optical source of either optical interface (305, 355, respectively) is collimated, with respect to itself, by one of the lenses (325, 355, respectively). However, the image of each optical interface (305, 355, respectively) is inverted by the lens system (325, 355) so that a mirror image of each interface (305, 355, respectively) is presented to the opposite optical interface by the lens system (305, 355). Thus, divergent light from each optical source is collimated only with respect to itself and not with respect to light from all the other optical sources as in the embodiment of FIG. 3A. The crossing beams of collimated light (330-1) are illustrated in FIG. 3B.

Figure 3C:
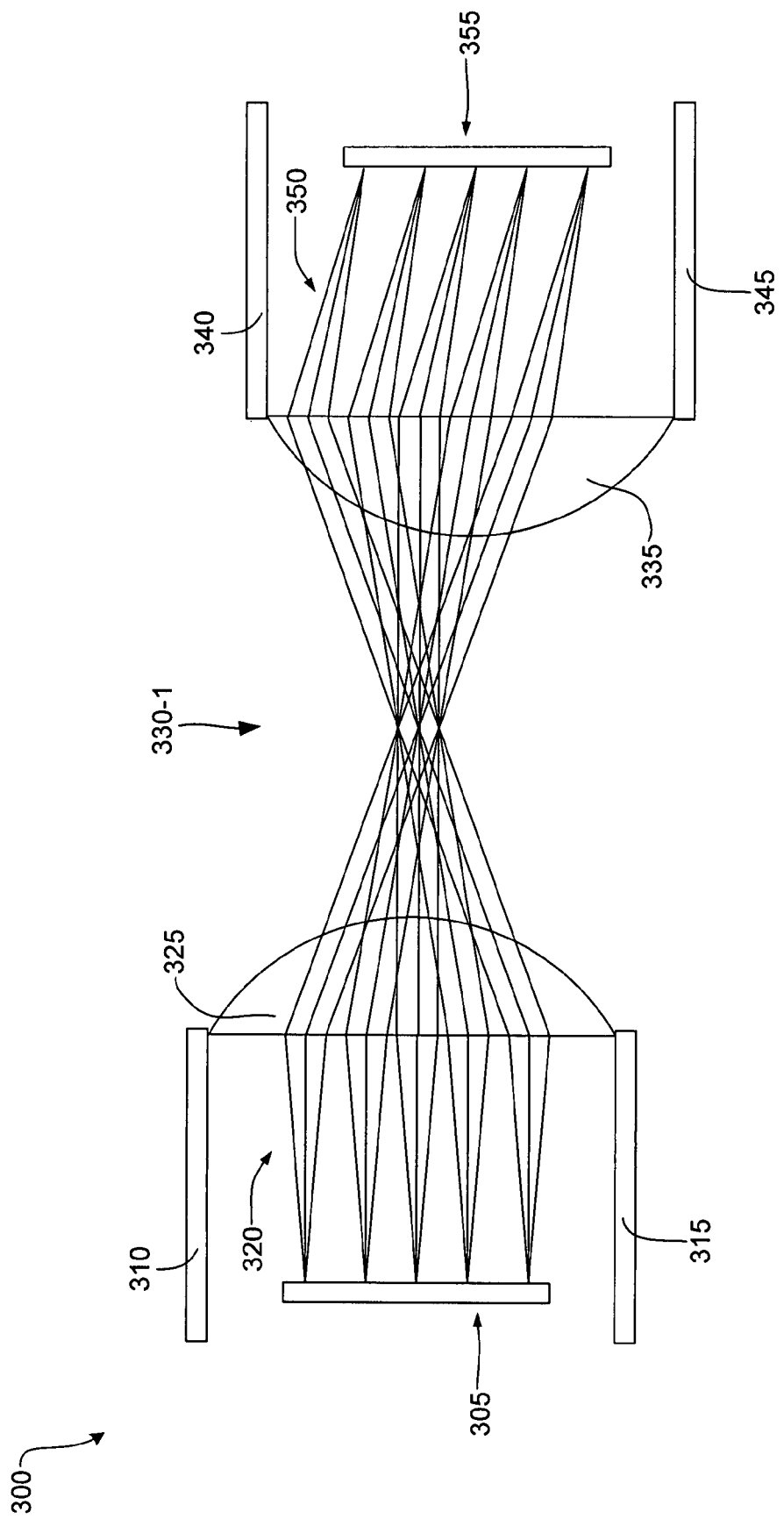
FIG. 3C is an illustration of an exemplary optical interconnect, according to principles described herein.

FIG. 3C illustrates the exemplary optical interconnect (300) in a state of misalignment between the first and second lenses (325, 335). In embodiments where the optical interconnect (300) is used to transmit data between two circuit boards in a rack, misalignment may occur due to a variety of reasons. The optical interconnect (300) of the present specification has a certain degree of tolerance to misalignment. When the first and second lenses (325, 335) are misaligned, the geometry and curvature of the refocusing second lens (335) may compensate for the alignment error by refocusing the collimated optical beams from the first lens (325) onto the second optical interface (355) at an angle that is variable according to the angle at which the optical beams are incident on the second lens (335). The same is also true of the first lens (325) with respect to optical beams propagating from the second lens (355) to the first lens (325).

Figure 3D:
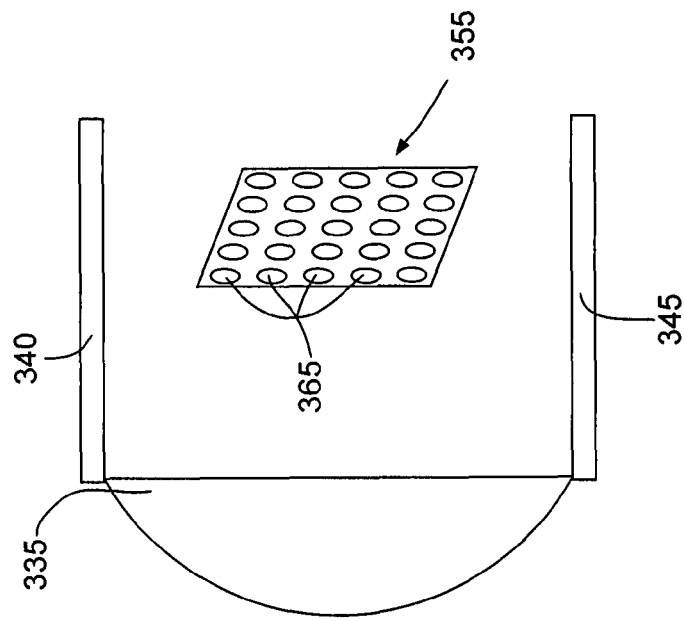
FIG. 3D is an illustration of an exemplary optical interconnect according to principles described herein.
Figure 3D:
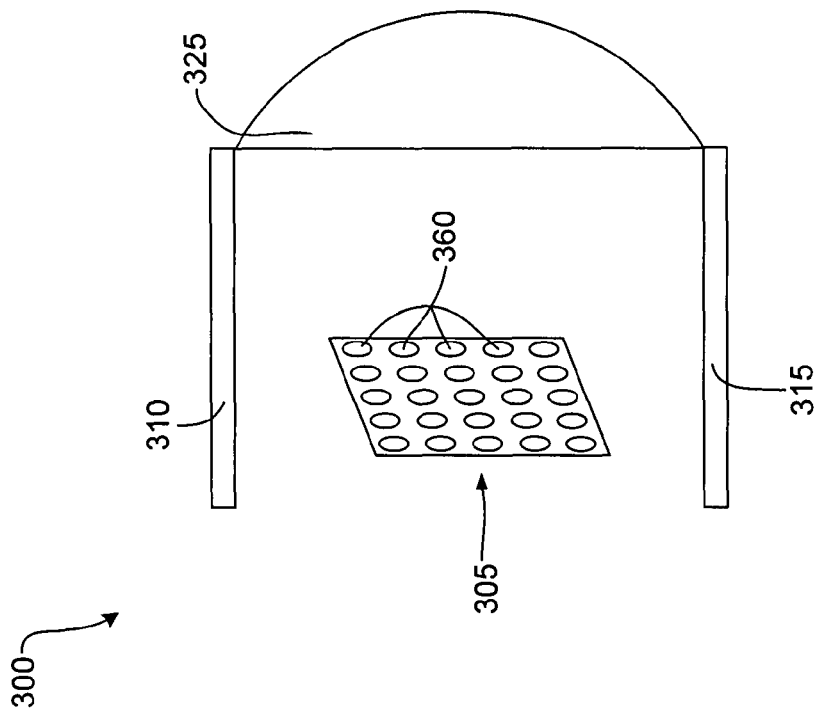

In FIG. 3D, the optical interconnect (300) is shown without the optical beams and with the first and second optical interfaces (305, 355) angled outward for clarity. The first optical interface (305) includes a plurality of optical sources (360) and the second optical interface (355) includes a plurality of optical receivers (365).

Figure 4:
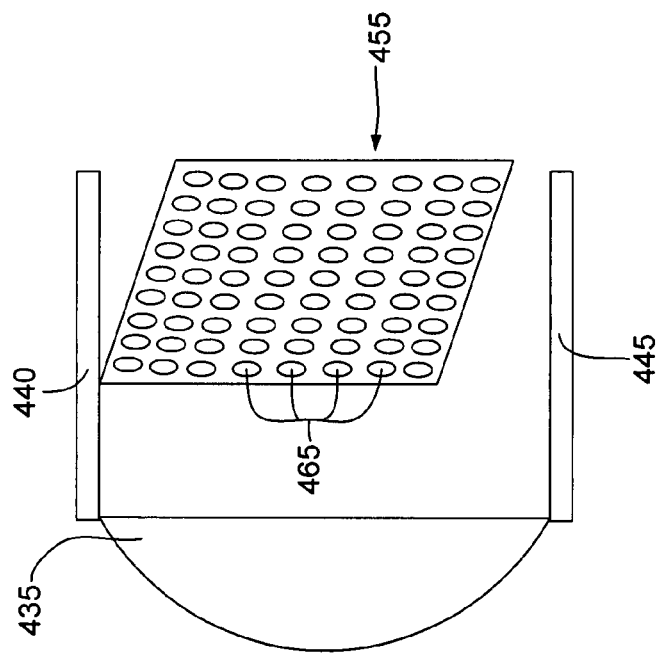
FIG. 4 is an illustration of an exemplary optical interconnect, according to principles described herein.
Figure 4:
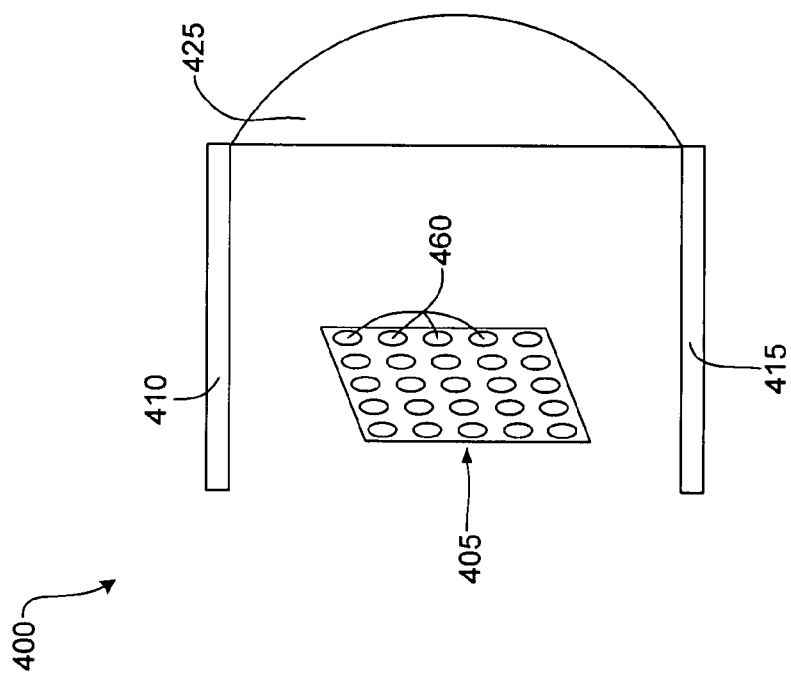

Referring now to FIG. 4, another exemplary optical interconnect (400) is shown. The optical interconnect (400) includes first and second optical interfaces (405, 455), first and second opposing convex lenses (425, 435), and housing brackets (410, 415, 440, 445) for the first and second lenses (425, 435).

The first optical interface (405) includes a plurality of divergent optical sources (460) configured to project a plurality of divergent optical beams encoded with data to the first lens (425), which is configured to collimate the optical beams and project the collimated optical beams to the second lens (435), which is configured to refocus the optical beams. The resulting plurality of divergent optical beams is transmitted from the second lens (435) to a plurality of optical receivers (465) in the second optical interface (455).

In the present embodiment, the second optical interface (455) has more optical receivers (465) than the number of optical sources (460) present in the first optical interface (405). This system of redundant optical receivers (465) allows for greater flexibility in angular and positional misalignment between the first and second lenses (425, 435). With a greater surface area to which the refocused optical beams may be projected from the second lens (435), the probability that a refocused optical beam is received by an optical receiver (465) on the second optical interface (455) is much higher under less-than optimal lens alignment conditions. Using signal processing on the optical beams received at specific optical receivers (465) in the second optical interface (455), the originating optical sources (460) of the received optical beams may be identified, and the encoded data may thereafter be routed to its intended destination.

When the collimated optical beams are refocused on the optical detectors of the second optical interface (455), a position shift and/or an angular shift may occur. To avoid losing any data channels contained in the optical beams, the second optical interface (455) must have an array of optical receivers that is larger than the array of optical sources on the first optical interface (405) on all sides by an amount greater than the maximum possible image displacement.

Both of the displacement and rotation of the detected optical beams may be detected using known image processing techniques. Initially, the position displacement may be determined by sending a test signal from a single optical source on the first optical interface (405) and finding the location of maximum intensity on the optical receiver array of the second optical interface (455). The displacement may be determined more precisely by calculating a centroid. If a second optical source in the first optical interface (405) is subsequently activated, the rotation error can also be estimated. This procedure can be performed on a timescale much faster than the mechanical vibrations in a system employing the optical interconnect (400), one of the chief contributing factors to lens misalignment, and at a low duty cycle so that the communication rate is not significantly reduced.

For continuous tracking of optical beam displacement, additional algorithms and techniques may be used. One such exemplary algorithm is described in U.S. Pat. No. 6,195,475, which is incorporated herein by reference in its entirety. As will be appreciated by one familiar with the art, many other image processing methods and algorithms may be used to calculate optical beam displacement, misalignment, and the like.

Once the optical beam displacement is known, this information must be used to convert the values indicated by individual optical receivers in the second optical interface (455) into data during communication. Generally, it is desirable to maximize signal strength detected at individual optical receivers in the second optical interface (455) while avoiding cross-talk from optical beams intended for neighboring optical receivers in the second optical interface (455). In some embodiments, sufficient space may be present between adjacent optical sources in the first optical interface (405) such that two optical sources may not be detected by the same optical receiver in the second optical interface (455).

In embodiments where the individual optical receivers in the second optical interface (455) include a plurality of detector elements, only the brightest detector element corresponding to a given optical source may be identified and demodulated as a source of data. Electronic circuitry may be present to route the output of each optical receiver to an appropriate data channel.

In still other embodiments, time division or wavelength division schemes may be utilized to avoid crosstalk between optical sources and their corresponding optical receivers in the first and second optical interfaces (405, 455, respectively).

Figure 5:
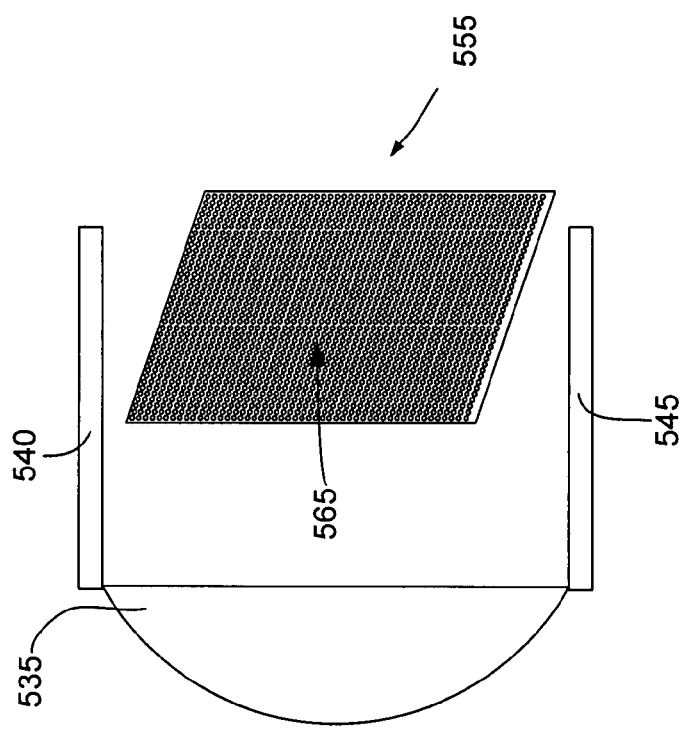
FIG. 5 is an illustration of an exemplary optical interconnect, according to principles described herein.
Figure 5:
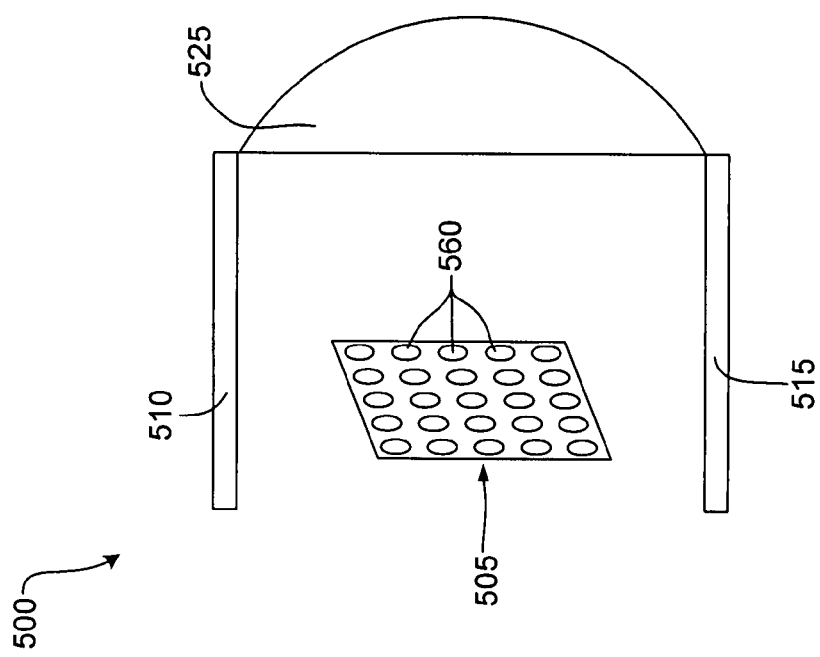

Referring now to FIG. 5, another exemplary optical interconnect (500) is shown. Like previous embodiments, the optical interconnect (500) includes first and second optical interfaces (505, 555), first and second opposing convex lenses (525, 535), and housing brackets (510, 515, 540, 545) for the first and second lenses (525, 535).

Consistent with the principles of the present specification, the first optical interface (505) includes a plurality of divergent optical sources (560) configured to project a plurality of divergent optical beams encoded with data to the first lens (525), which is configured to collimate the optical beams and project the collimated optical beams to the second lens (535), which is configured to refocus the optical beams. The resulting plurality of divergent optical beams is transmitted from the second lens (535) to a plurality of optical receivers (565) in the second optical interface (555).

To avoid errors or adverse communication conditions stemming from minor lens misalignments, the second optical interface (555) of the present embodiment includes a larger surface area than that of the first optical interface (505), and a plurality of optical receivers (565) having a smaller surface area than the width of optical beams from the optical sources on the first optical interface (505). In this way, a refocused optical beam transmitted from the second lens (535) to the second optical interface (555) may be detected by a plurality of redundant optical receivers (565) in the second optical interface (555). Signal processing algorithms may be used in conjunction with readings from the optical receivers (565) in the second optical interface (555) to determine the source of optical beams received and route encoded data from the received optical beams to their intended recipients.

Exemplary System

Figure 6:
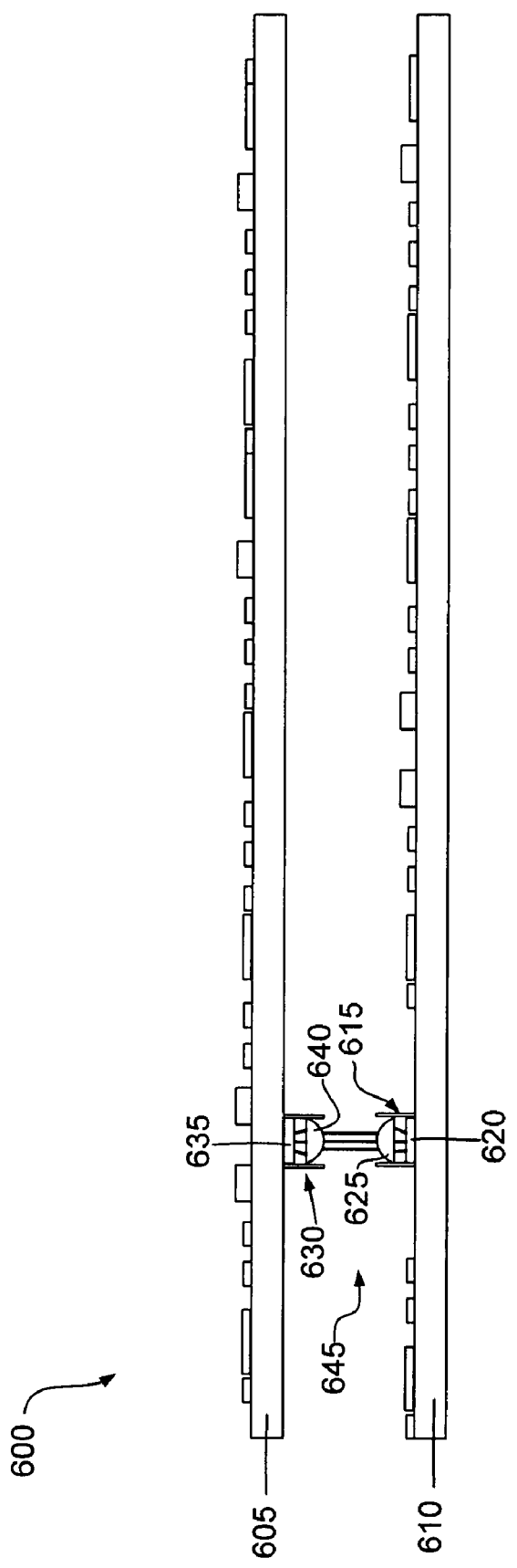
FIG. 6 is an illustration of an exemplary optical communication system employing an exemplary optical interconnect, according to principles described herein.

Referring now to FIG. 6, an exemplary system (600) is shown. The exemplary system (600) includes a first circuit board (605) and a second circuit board (610), and utilizes an exemplary optical interconnect (645) according to the principles of the present specification. The exemplary optical interconnect (645) is used to transmit data encoded on optical beams between components of the first and second circuit boards (605, 610). The circuit boards (605, 610) may be housed in a rack, in which multiple circuit boards may be selectively connected, removed, and/or replaced.

As it may be very desirable to replace boards in a rack quickly and easily, the optical interconnect (645) is configured to be tolerant of small placement errors of the circuit boards (605, 610). The optical interconnect (645) includes first and second optical interfaces (620, 635), first and second opposing convex lenses (625, 640), and housings (615, 630) to anchor the first and second lenses (625, 640) in substantially fixed positions with respect to the first and second optical interfaces (620, 635, respectively).

Consistent with principles discussed previously in the present specification, the first lens (625) is configured to collimate divergent encoded optical beams originating from optical sources in the first optical interface (620). The first lens (625) is further configured to refocus optical beams directed to the first lens (625) from the second lens (640) and route the resulting divergent optical beams to optical receivers in the first optical interface (620).

Likewise, the second lens (640) is configured to collimate divergent encoded optical beams originating from optical sources in the second optical interface (635). The second lens (640) is further configured to refocus optical beams directed to the second lens (640) from the first lens (625) and route the resulting divergent optical beams to optical receivers in the second optical interface (635). As described above, the collimated light may be transmitted linearly between the lenses (625, 640) or may be inverted between the lenses (625, 640) so that a mirror image is presented to the opposite optical interface (620, 635, respectively).

The optical receivers in the optical interfaces (620, 635) may have hardware and/or software to encode, modulate, decode, and/or demodulate data to and from optical beams that are transmitted and received between the two circuit boards (605, 610). Furthermore, the optical interfaces (620, 635) may include signal processing hardware and/or software to match detected optical beams to optical sources in an optical interface on a corresponding circuit board, consistent with principles described herein. Additionally, lens misalignment tolerances may be increased according to principles previously described in the present specification.

Exemplary Method

Figure 7:
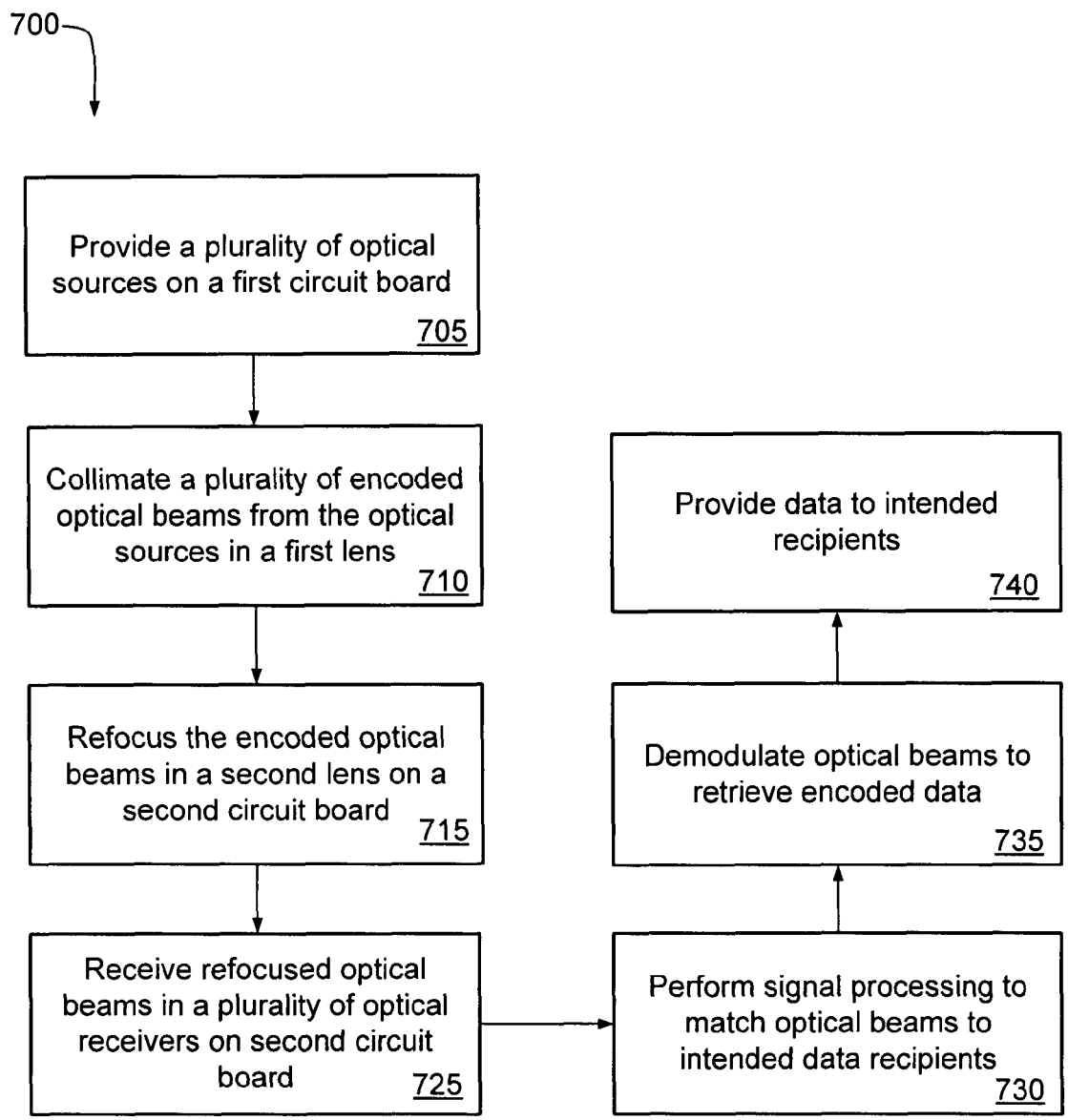
FIG. 7 is a flowchart illustrating an exemplary method of optical communication, according to principles described herein.

Referring now to FIG. 7, a flowchart illustrating an exemplary method (700) of optical communication is shown. The exemplary method (700) includes providing (step 705) a plurality of optical sources on a first circuit board, collimating (step 710) a plurality of encoded optical beams from the optical sources in a first lens, refocusing (step 715) the encoded optical beams in a second lens on a second board, and receiving (step 725) the refocused optical beams in a plurality of optical receivers on the second board.

Signal processing is then performed (step 730) to match the received optical beams to their corresponding intended data recipients. The received optical beams are then demodulated (step 735) to retrieve the encoded data, and the data is provided (step 740) to its intended recipients.

The method (700) may further include the steps of substantially aligning the first lens and the second lens, and determining from which of a plurality of optical sources the optical beams detected by the optical receivers originate.

What is claimed is:

1. An optical interconnect, comprising:
   a plurality of optical sources,
   a first lens comprising a singularly curved surface, said singularly curved surface being configured to collimate optical beams from each said optical source in said plurality of optical sources, said optical beams from said optical sources all being collimated with respect to each other, said first lens being positioned over said plurality of optical sources at a distance equal to a focal length of said first lens such that said singularly curved surface of said first lens overlaps each said optical source in said plurality of optical sources;
   a second lens comprising a singularly curved surface opposite and substantially aligned with said singularly curved surface of said first lens, said singularly curved surface of said second lens being configured to refocus each of said optical beams; and
   a plurality of optical receivers configured to receive said refocused optical beams from said second lens; said second lens being positioned over said plurality of optical receivers at a distance equal to a focal length of said second lens such that said singularly curved surface of said second lens overlaps each said optical receiver in said plurality of optical receivers; wherein said second lens is further configured to collimate optical beams from a second plurality of optical sources that are located with said plurality of optical receivers and directs said collimated optical beams toward said first lens.

2. The optical interconnect of claim 1, wherein said plurality of optical receivers comprises at least one optical receiver corresponding to each of said plurality of optical sources.

3. The optical interconnect of claim 2, further comprising a signal processing module configured to determine from which of said plurality of optical sources an optical beam detected by at least one of said plurality of optical receivers originates.

4. The optical interconnect of claim 3, wherein said optical receivers are configured to demodulate said optical beams to retrieve said data.

5. The optical interconnect of claim 1, wherein said optical beams are encoded with data.

6. The optical interconnect of claim 1, wherein said first lens is further configured to refocus said optical beams from said second plurality of optical sources and direct said optical beams from said second plurality of optical sources to a second plurality of optical receivers.

7. The optical interconnect of claim 1, wherein said first lens and said second lens comprise substantially convex, concave or aspheric surfaces.

8. An interboard communication system, comprising:
a first circuit board, comprising a plurality of optical sources and a first lens, wherein said first lens comprises a singularly curved surface configured to collimate optical beams from each said optical source in said plurality of optical sources, said optical beams from said optical sources all being collimated with respect to each other, said first lens being positioned over said plurality of optical sources at a distance equal to a focal length of said first lens such that said singularly curved surface of said first lens overlaps each said optical source in said plurality of optical sources;
a second circuit board, comprising a plurality of optical receivers and a second lens, wherein said second lens comprises a singularly curved surface opposite and substantially aligned with said singularly curved surface of said first lens, said singularly curved surface of said second lens being configured to refocus each of said optical beams and direct said optical beams to said optical receivers, said second lens being positioned over said plurality of optical receivers at a distance equal to a focal length of said second lens such that said singularly curved surface of said second lens overlaps each said optical receiver in said plurality of optical receivers; wherein said second lens is further configured to collimate optical beams from a second plurality of optical sources that are located with said plurality of optical receivers and directs said collimated optical beams toward said first lens.

9. The interboard communication system of claim 8, wherein said first circuit board comprises a data modulator element configured to encode data on said optical beams.

10. The interboard communication system of claim 8, wherein said second circuit board comprises a demodulator element configured to retrieve encoded data from said optical beams.

11. The interboard communication system of claim 8, wherein said second circuit board comprises a signal processing module configured to determine from which of said plurality of optical sources a detected optical beam originates.

12. A method of optical communication, said method comprising:
collimating in a first singularly convex lens a plurality of optical beams originating from a plurality of optical sources, said optical beams from said optical sources all being collimated with respect to each other, said first singularly convex lens being positioned over said plurality of optical sources at a distance equal to a focal length of said first singularly convex lens such that a singularly convex surface of said first singularly convex lens overlaps each said optical source in said plurality of optical sources;
refocusing said plurality of optical beams in a second singularly convex lens to a plurality of optical receivers, said second singularly convex lens being positioned over said plurality of optical receivers at a distance equal to a focal length of said second singularly convex lens such that a singularly convex surface of said second singularly convex lens overlaps each said optical receiver in said plurality of optical receivers, said singularly convex surface of said second singularly convex lens being opposite and substantially aligned with said singularly convex surface of said first singularly convex lens; and
receiving said refocused plurality of optical beams from said second lens in said plurality of optical receivers; and with said second lens collimating optical beams from a second plurality of optical sources that are located with said plurality of optical receivers and directing said collimated optical beams toward said first lens.

13. The method of claim 12, further comprising encoding data on said optical beams.

14. The method of claim 13, further comprising determining at least one intended recipient of data encoded on said optical beams.

15. The method of claim 14, further comprising demodulating said optical beams and providing said data to said at least one intended recipient.

16. The method of claim 12, further comprising substantially aligning said first lens and said second lens.

17. The method of claim 12, further comprising determining from which of a plurality of optical sources said optical beams originate.

* * * * *